(12) United States Patent
Isberg et al.

(10) Patent No.: US 10,740,321 B2
(45) Date of Patent: Aug. 11, 2020

(54) SYSTEM AND METHOD FOR PROVIDING GENERIC USER PROFILES BASED ON USER BEHAVIOUR

(71) Applicant: Sony Mobile Communications Inc., Tokyo (JP)

(72) Inventors: Anders Isberg, Åkarp (SE); Magnus Hallqvist, Lund (SE); Jonas Gustavsson, Lomma (SE)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 15/460,316

(22) Filed: Mar. 16, 2017

(65) Prior Publication Data
US 2017/0270568 A1 Sep. 21, 2017

(30) Foreign Application Priority Data

Mar. 16, 2016 (EP) .................................... 16160691

(51) Int. Cl.
*G06F 16/23* (2019.01)
*G06F 16/9035* (2019.01)

(52) U.S. Cl.
CPC .......... *G06F 16/2358* (2019.01); *G06F 16/23* (2019.01); *G06F 16/9035* (2019.01)

(58) Field of Classification Search
CPC ......... G06F 17/30867; G06F 17/30702; G06F 17/30598; G06F 17/30035; G06F 17/3053; G06F 16/9035; G06F 16/2358; G06F 16/23; H04L 67/306; H04N 21/44222; G06Q 30/02; G06Q 30/0269
See application file for complete search history.

(56) References Cited

U.S. PATENT DOCUMENTS

| 8,464,292 B2* | 6/2013 | Xiao | H04N 5/44543 725/45 |
| 8,891,794 B1* | 11/2014 | Lin | H04R 1/1091 381/315 |
| 9,270,778 B1* | 2/2016 | Brown | G06Q 30/02 |
| 9,449,526 B1* | 9/2016 | Tseng | G09B 7/02 |

(Continued)

OTHER PUBLICATIONS

Thomsen, J. et al., Evolution of Context-aware User Profiles, Oct. 12-14, 2009, IEEE, 2009 International Conference on Ultra Modern Telecommunication & Workshops, pp. 1-6 (Year: 2009).*

(Continued)

*Primary Examiner* — James Trujillo
*Assistant Examiner* — Michal Bogacki
(74) *Attorney, Agent, or Firm* — Renner, Otto, Boisselle & Sklar, LLP

(57) ABSTRACT

A method for generating a profile for a user based on the user's behaviour and altering a setup of at least one computer program based on the generated user profile. The generic user profile for a user may be updated to include information from a similar user (e.g., a user having similar preferences). Using information from similar users allows for a generic user profile to be generated using information extracted from applications (e.g., both social media and games) and/or based on the behaviour of connections (e.g., social media contact, etc.). The generated generic user profile may be used to change the set-up for applications (e.g., executed/stored on the user's mobile device).

20 Claims, 3 Drawing Sheets

(56) References Cited

U.S. PATENT DOCUMENTS

| | | | | |
|---|---|---|---|---|
| 2001/0044739 | A1* | 11/2001 | Bensemana | G06Q 30/02 |
| | | | | 705/7.32 |
| 2003/0087652 | A1* | 5/2003 | Simon | G06Q 30/02 |
| | | | | 455/466 |
| 2006/0047725 | A1* | 3/2006 | Bramson | G06F 21/604 |
| 2008/0214157 | A1* | 9/2008 | Ramer | G06F 17/30749 |
| | | | | 455/414.1 |
| 2009/0276459 | A1* | 11/2009 | Trout | G06Q 10/10 |
| 2009/0327314 | A1* | 12/2009 | Kim | G06Q 10/10 |
| 2009/0327449 | A1* | 12/2009 | Silverman | H04M 1/72527 |
| | | | | 709/217 |
| 2012/0173682 | A1* | 7/2012 | Mantere | G06F 9/44505 |
| | | | | 709/221 |
| 2013/0080911 | A1* | 3/2013 | Klemm | G06F 17/3089 |
| | | | | 715/745 |
| 2013/0238425 | A1* | 9/2013 | Saldanha | G06Q 30/02 |
| | | | | 705/14.48 |
| 2014/0032259 | A1* | 1/2014 | LaFever | G06Q 30/0201 |
| | | | | 705/7.29 |
| 2014/0059647 | A1* | 2/2014 | Immonen | H04L 63/08 |
| | | | | 726/3 |
| 2014/0075352 | A1* | 3/2014 | Hansen | G06F 9/4451 |
| | | | | 715/765 |
| 2014/0075385 | A1* | 3/2014 | Wan | G06Q 10/1093 |
| | | | | 715/812 |
| 2014/0309790 | A1* | 10/2014 | Ricci | H04W 4/21 |
| | | | | 700/276 |
| 2015/0096019 | A1* | 4/2015 | Davis | H04L 63/1408 |
| | | | | 726/23 |
| 2016/0125471 | A1* | 5/2016 | Hsu | G06Q 30/0269 |
| | | | | 705/14.66 |
| 2016/0255170 | A1* | 9/2016 | Gargi | G06F 16/9535 |
| | | | | 709/204 |
| 2017/0139802 | A1* | 5/2017 | Hajiyev | G06F 11/3476 |

OTHER PUBLICATIONS

Facebook, "Where can I find my Facebook settings?", 2019, Facebook, p. 1, <https://www.facebook.com/help/android-app/166986580029611?helpref=faq_content> (Year: 2019).*

Extended European Search Report dated May 19, 2016 for European Application No. EP16160691.8.

* cited by examiner

SYSTEM AND METHOD FOR PROVIDING GENERIC USER PROFILES BASED ON USER BEHAVIOUR

RELATED APPLICATIONS

This application claims the benefit of European Patent Application No. 16160691 filed on Mar. 16, 2016, that is herein incorporated by reference in its entirety.

TECHNICAL FIELD

The disclosure pertains to the field of user profiles related to computer related applications (Apps). More particularly the disclosure relates to generic user profiles updated to include behaviour data for a user.

BACKGROUND ART

The stakes to compete in computer related applications (Apps) and the game market are extremely high. Today end users expect that Apps are free to download. App developers have to make revenues by using other ways such as advertising or in-app purchase. The cost for an App developer to acquire a user is expensive and most of the budget is typically spent on advertising.

For developers it is essential to spend their acquisition budget on the right users. Therefore it is important to have a good profile of a potential user and to be able to detect when there is a potential opportunity to get the end user's attention.

In addition, traditional profiling of the users is very static and does not necessarily fit well with a real user behaviour or actions. For example when a user finds a new type of game, the skill level might change from experienced to beginner if the user starts to play games within a new genre. These distinctions are very essential and distributing those in real-time helps developers and advertising networks (Ad network) to make correct decisions. Hence, there is a need for improving profiling of users of Apps.

A single user may have several Apps downloaded on an electronic device, such as a smartphone, tablet, etc. and each App uses separate user profiles. This can make it a hassle for users to handle and update the profiles for the different applications.

SUMMARY OF THE INVENTION

With the above description in mind, this disclosure provides, e.g., a method and system that mitigates, alleviates, or eliminates one or more of the above-identified deficiencies in the art and disadvantages singly or in any combination and provides a solution where a generic user profile may be continuously updated based on the behaviour of the user. This is achieved by logging (e.g., continuously) the behaviour of a user.

The present disclosure provides a method for generating a profile for a user based on the user's behaviour and altering a setup of at least one computer program based on the generated user profile.

According to one aspect, there is provided a method for generating a generic user profile based on user behaviour data. The method includes accessing a generic user profile for a user including behaviour data, the generic user profile of the user stored in a non-transitory computer readable medium. The method also includes logging behaviour data for the user, the logged behaviour data including at least one of actions performed by the user in computer applications, a profile of the user on social media networks, or actions performed by the user on social media networks. The method further includes transmitting the logged behaviour data to a processing device and updating, with the processing device, the generic user profile of the user to include the transmitted user behaviour data. The method additionally includes updating with the processing device at least one user profile of at least one computer program installed on an electronic communication device of the user based on the updated generic user profile. Updating the user profiles of a particular computer program alters a setup of the particular computer program.

Alternatively or additionally, updating the generic user profile of the user to include the transmitted user behaviour data includes, for particular behaviour data in the generic user profile of the user that is incongruous with the transmitted behaviour data, overwriting the particular behaviour data included in the generic user profile of the user with the transmitted user behaviour data. The updating also includes, for the transmitted user behaviour data that is not incongruous with the behaviour data in the generic user profile of the user, adding the transmitted user behaviour data to the behaviour data included in the generic user profile of the user.

Alternatively or additionally, the non-transitory computer readable medium stores a plurality of generic user profiles. Each of the generic user profiles correspond to a particular user. Each of the generic user profiles includes behaviour data for the particular user. The method further includes identifying with the processing device at least one matching user profile of the plurality of generic user profiles, the at least one matching user profile including behaviour data matching the transmitted behaviour data included in the generic user profile of the user. The method additionally includes updating with the processing device the generic user profile of the user to include behaviour data included in the at least one matching user profile that does not correspond to any of the behaviour data included in the generic user profile of the user.

Alternatively or additionally, behaviour data of a first user matches behaviour data of a second user when a percentage of the behaviour data of the first user that is equivalent to behaviour data of the second user is greater than a predefined threshold.

Alternatively or additionally, each of the generic user profiles additionally includes class data identifying at least one class that the particular user is associated with. Each class includes default user behaviour data for members of the class. The method further includes, for each of the at least one class that the generic user profile of the user is associated with, updating the generic user profile of the user to include the default user behaviour data for each of the at least one class.

Alternatively or additionally, the class data for a specific user that is not associated with any particular class identifies that the specific user is not the member of any class.

Alternatively or additionally, the method also includes updating the generic user profile of the user with the processing device by setting a status of the class data identifying a particular class to disabled when the transmitted user behaviour data is incongruous with the default user data of the particular class. The user profile is updated to remove the default user behaviour of the particular class from the behaviour data included in the generic user of the user profile when the status of the class data identifying the particular class is set to disabled.

Alternatively or additionally, the method also includes subscribing to updates to the default user behaviour of at least one particular class that the generic user profile of the user is associated with. When the default user behaviour of at least one particular class is updated, the method also includes behaviour data of the generic user profile of the user is updated based on the modification of the default user behaviour of the at least one particular class.

Alternatively or additionally, the subscription is limited in time.

Alternatively or additionally, the method also includes, when the generic user profile of the user does not exist, identifying with the processing device a specific user profile for a specific user of the plurality of generic user profiles, wherein the specific user and the user are connected via social media and/or when the specific user and the user interact electronically greater than a predetermined threshold. The method also includes creating the generic user profile of the user by copying the specific user profile of the plurality of generic user profile into the generic user profile of the user.

Alternatively or additionally, updating the generic user profile comprises overwriting the behaviour data of the generic user profile of the user that was copied from the specific user profile with the transmitted user behaviour data when the actions of the transmitted user behaviour data are incongruous with the copied user behaviour data.

According to another aspect, a system for generating a generic user profile based on user behaviour data. The system includes a data storage device including a non-transitory computer readable medium storing at least one generic user profile for a user including behaviour data and an electronic communication device associated with the user. The electronic communication device includes circuitry configured to access the generic user profile stored in the non-transitory computer readable medium and log behaviour data for the user, the logged behaviour data including at least one of actions performed by the user in computer applications, a profile of the user on social media networks, or actions performed by the user on social media networks. The circuitry is further configured to transmit the logged behaviour data to a processing device. The processing device is configured to update the generic user profile of the user to include the transmitted user behaviour data. The circuitry of the electronic communication device is further configured to update at least one user profile of at least one computer program installed on the electronic communication device based on the updated generic user profile. Updating the user profiles of a particular computer program alters a setup of the particular computer program.

Alternatively or additionally, updating the generic user profile of the user to include the transmitted user behaviour data includes, for particular behaviour data in the generic user profile of the user that is incongruous with the transmitted behaviour data, overwriting the particular behaviour data included in the generic user profile of the user with the transmitted user behaviour data. The updating also includes, for the transmitted user behaviour data that is not incongruous with the behaviour data in the generic user profile of the user, adding the transmitted user behaviour data to the behaviour data included in the generic user profile of the user.

Alternatively or additionally, the non-transitory computer readable medium stores a plurality of generic user profiles. Each of the generic user profiles correspond to a particular user. Each of the generic user profiles includes behaviour data for the particular user. The processing device is further configured to identify at least one matching user profile of the plurality of generic user profiles, the at least one matching user profile including behaviour data matching the transmitted behaviour data included in the generic user profile of the user. The processing device is also configured to update the generic user profile of the user to include behaviour data included in the at least one matching user profile that does not correspond to any of the behaviour data included in the generic user profile of the user.

Alternatively or additionally, the processing device is further configured to, when the generic user profile of the user does not exist, identify a specific user profile for a specific user of the plurality of generic user profiles. The specific user and the user are connected via social media and/or when the specific user and the user interact electronically greater than a predetermined threshold. The processing device is also configured to create the generic user profile of the user by copying the specific user profile of the plurality of generic user profile into the generic user profile of the user.

Alternatively or additionally, each of the generic user profiles additionally includes class data identifying at least one class that the particular user is associated with. Each class includes default user behaviour data for members of the class. The processing device is further configured to, for each of the at least one class that the generic user profile of the user is associated with, update the generic user profile of the user to include the default user behaviour data for each of the at least one class.

According to an additional aspect, a non-transitory computer-readable storage medium including computer-executable instructions is provided. When executed by circuitry, the instructions provide access to a data storage device including a non-transitory computer readable medium storing at least one generic user profile for a user including behaviour data. The instructions also log user behaviour data for the user, the logged behaviour data including at least one of actions performed by the user in computer applications, a profile of the user on social media networks, or actions performed by the user on social media networks. The instructions also transmit the logged behaviour data to a processing device and update with the processing device the generic user profile of the user to include the transmitted user behaviour data. The instructions further update with the processing device at least one user profile of at least one computer program installed on an electronic communication device of the user based on the updated generic user profile. Updating the user profiles of a particular computer program alters a setup of the particular computer program.

Alternatively or additionally, updating the generic user profile of the user to include the transmitted user behaviour data includes, for particular behaviour data in the generic user profile of the user that is incongruous with the transmitted behaviour data, overwriting the particular behaviour data included in the generic user profile of the user with the transmitted user behaviour data. Updating also includes, for the transmitted user behaviour data that is not incongruous with the behaviour data in the generic user profile of the user, adding the transmitted user behaviour data to the behaviour data included in the generic user profile of the user.

Alternatively or additionally, the non-transitory computer readable medium stores a plurality of generic user profiles. Each of the generic user profiles correspond to a particular user. Each of the generic user profiles includes behaviour data for the particular user. The instructions that, when executed by circuitry, additionally identify with the processing device at least one matching user profile of the plurality of generic user profiles, the at least one matching user profile including behaviour data matching the transmitted behaviour data included in the generic user profile of the user. The instructions also update, with the processing device, the generic user profile of the user to include behaviour data included in the at least one matching user profile that does not correspond to any of the behaviour data included in the generic user profile of the user.

Alternatively or additionally, said instructions that (when executed by circuitry) additionally, when the generic user profile of the user does not exist, identify with the processing device a specific user profile for a specific user of the plurality of generic user profiles. The specific user and the user are connected via social media and/or when the specific user and the user interact electronically greater than a predetermined threshold. The instructions also create the generic user profile of the user by copying the specific user profile of the plurality of generic user profile into the generic user profile of the user.

A number of features are described herein with respect to embodiments of the invention; it will be appreciated that features described with respect to a given embodiment also may be employed in connection with other embodiments.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Figure 1:
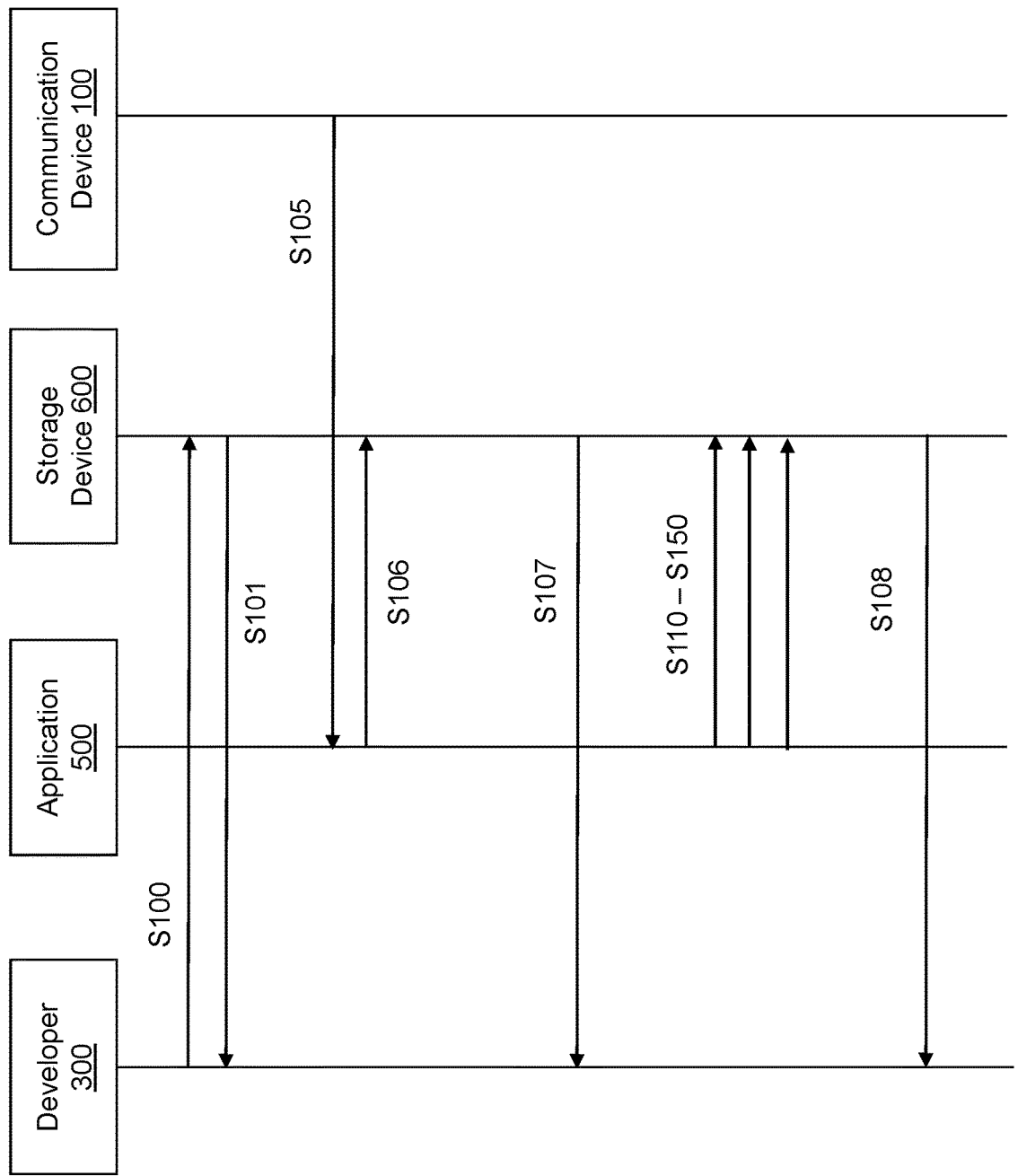
FIG. 1 illustrates the interaction between the parts of the system of FIG. 5 when updating a generic user profile.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

The present disclosure provides a method for generating a profile for a user based on the user's behaviour and altering a setup of at least one computer program based on the generated user profile. The generic user profile for a user may be updated to include information from a similar user (e.g., a user having similar preferences). Using information from similar users allows for a generic user profile to be generated using information extracted from applications (e.g., both social media and games) and/or based on the behaviour of connections (e.g., social media contact, etc.). The generated generic user profile may be used to change the set-up for applications (e.g., executed/stored on the user's mobile device).

When an application (i.e., an app) is launched by a user, the application may outsource the processing of data related to user behaviour to a tracking component (e.g., the Track backend). The application may report user behaviour data with some contextual meaning to the Track backend, for example a user finalized level 1 in a game with score 55 out of 65. The Track backend may associate user behaviour data with one unique anonymous identity, a generic user profile. It may not be revealed how the anonymous identity can be translated into the real identity. The advantage with this architecture is that user behaviour data from several applications can be used to create a generic user profile used by at one or more applications instead of having one user profile for each application. In other words, the generic user profile may be used to continuously update the user profiles of one or more applications on the electronic device of the user.

The Track backend processes the user behaviour data and stores the data persistently in a user profile data base. The persistently stored user behaviour data may be processed using, e.g., at least one of a machine Learning algorithm, a model of the user, or a generic machine learning algorithm. Consequently the generic user profile may become more accurate over time based on how the user's interest and behaviour evolve.

When a new user A is detected in the system, the system checks if there is another user (e.g., user B) or a group of users that are similar to new user A, e.g. based on a contextual social graph. A generic profile of user A may be initiated by copying or bootstrapping the matching profile of user B (or a group of users). Once the profile of user A is bootstrapped, the profile may be refined based on behaviour data for new user A. In this way, a dynamic generic user profile is provided which is continuously evolving or updated.

The generic user profile may be made available to trusted parties that may use the anonymous identity to query the user profile or subscribe to updated events of the user profile. The trusted party could be an application developer, application store or an Ad network that could use this information to make decisions whether to show an Ad/Recommendation to a specific user or to tailor the logic in an application.

This could be done for example by matching user generic characteristics with application characteristics. For example, a game with the characteristics: cartoon graphics, online multiplayer, competitive, micro transactions, perfectionist could be matched against a player with the same characteristics. Another way of matching the players and the games is to bundle players in different groups and recommend games which other players in the group enjoy.

The user profile is also important when tailoring the application logic. For example, a player with a user profile comprising the user characteristics: experience shooter, perfectionist could skip the first 10 levels that probably are too easy, thus the player will start at level 11 of the game.

Another example could be a player who replays every level until he/she gets the highest score. This behaviour could be profiled as a perfectionist.

Another example could be a player who likes to plays different kinds of online shooter games, such person could be profiled as a multiplayer first person shooter.

A dynamic group profiles may also be created. A dynamic group profile is a group of users that has a similar user profiles. It is likely that these users are using the same type of applications. The grouping could either be done every time a new event occurs or by some background task. The membership of a user in a group profile may be limited in time. For example, if there are no events proving a certain membership, the membership in the profile may be revoked. For example, a user starting office mail would join the group "at office" with an 8 hour freshness time. The trusted parties that are authorized to query the profiles can also be authorized to subscribe on events when a user is joining or leaving a user group.

FIG. 1 illustrates the interaction between a developer 300, application 500, storage device 600, and a communication device 100.

Figure 3:
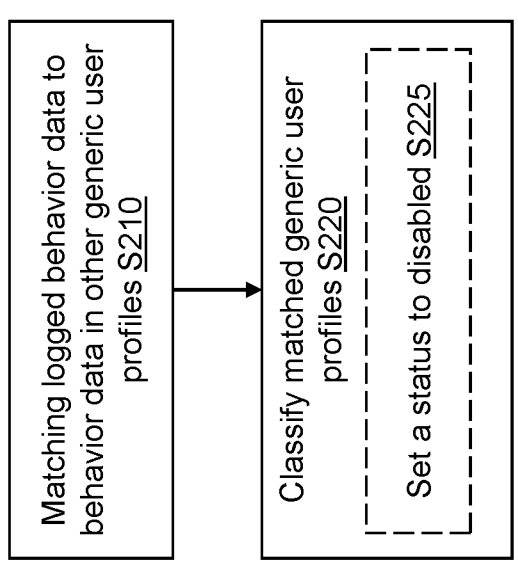
FIG. 3 illustrates the method for providing a generic user profile according to some example embodiments.
Figure 4:
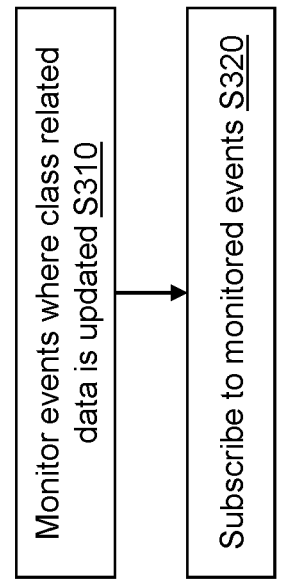
FIG. 4 illustrates the method for providing a generic user profile according to some example embodiments.
Figure 2:
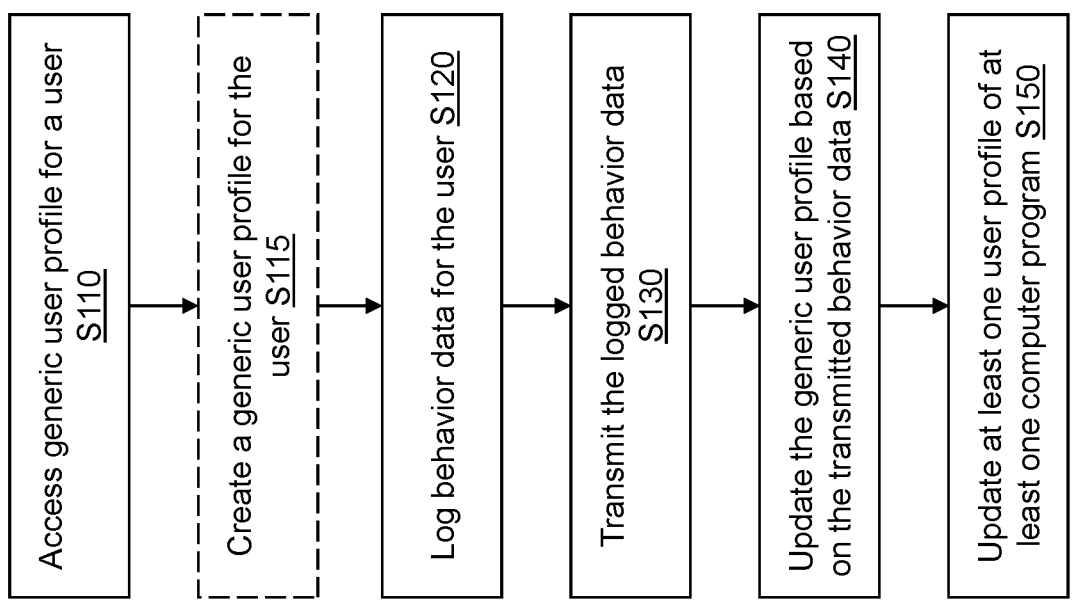
FIG. 2 illustrates the method for providing a generic user profile according to some example embodiments.

FIGS. 2 to 4 illustrates the method described below.

The interaction, as shown in FIG. 1, may comprises the following steps:

1) An App developer publishes an App S100 on a Server (e.g., of the App developer) 300.
2) A Track backend (in this example a storage device 600) receives reports for, e.g., from Apps and devices describing different events that are relevant. The Track backend may communicate S101 with the developer 300 and send a message of acceptance when the App is published, updated, or otherwise available.
3) The App is launched S105 on an electronic communication device 100 (e.g. mobile phone) of User A 10 and the App communicates S106 with the Track backend that the App has been launched.
4) If User A is new (i.e. does not exist in a user profile database stored on a storage device 600) a user profile of user A is initiated (e.g., by bootstrapping S115 a matching user profile of an existing user B). This event may be reported S107 by the Track backend to the developer 300 and an Ad network if they subscribe to such an event.
5) The App 500 starts to log and report S110-S150 the activity or behaviour of user A to Track backend 200. The generic user profile of user A is updated based on the logged activity or behaviour.
6) It may be detected that user A has a profile similar to other users that are grouped into a dynamic group (e.g. group X). User A may then be classified S210-225 as a member of group X. This event may be reported S108 by the Track backend to the developer 300.

Ad networks and App developer may subscribe to changes within the generic user profiles. This information may then be used to advertise/sell new apps or updates of apps, thus the usage of user actions behaviour and in-app achievements improve application discovery.

Figure 5:
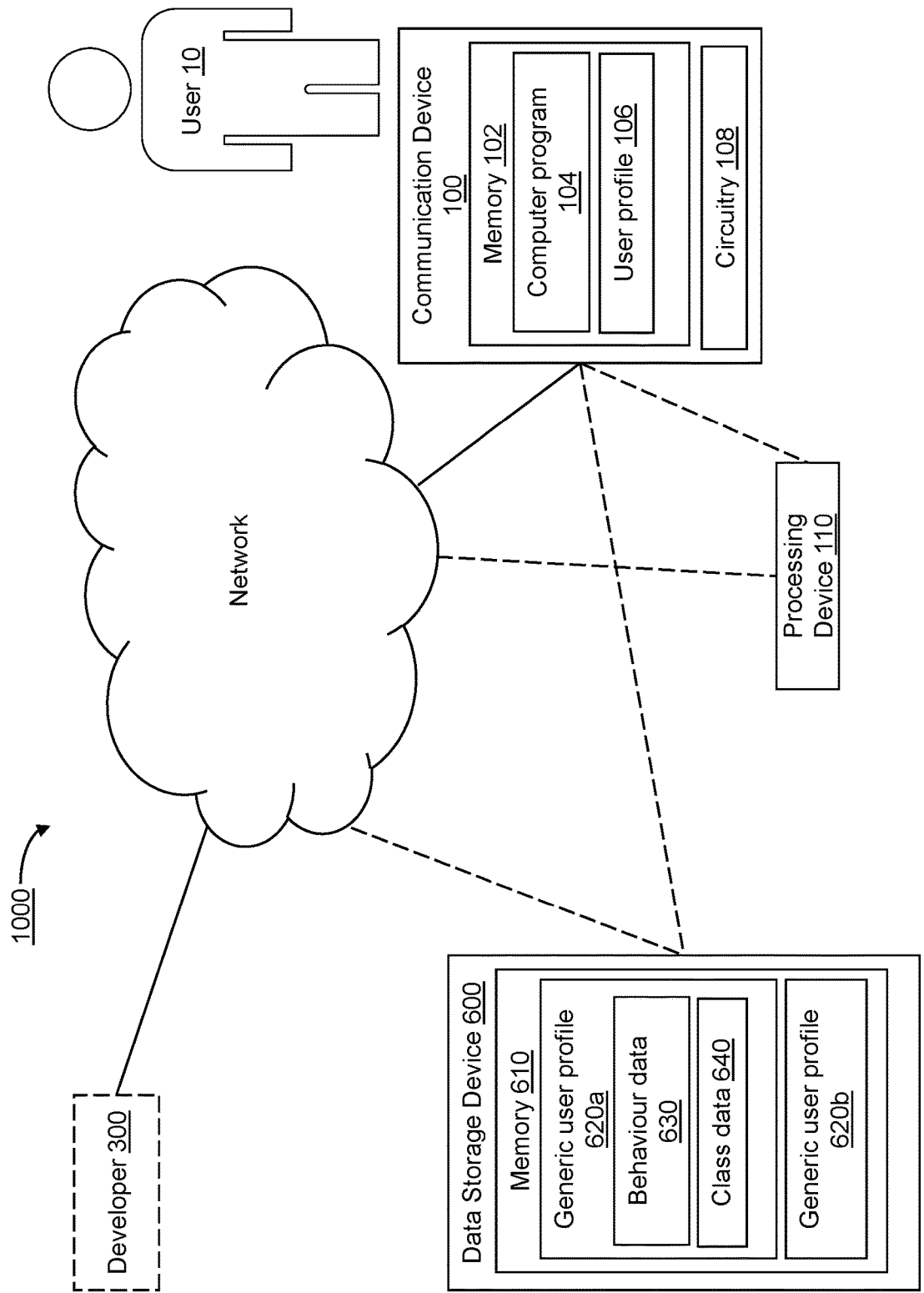
FIG. 5 illustrates a system for providing a generic user profile according to some example embodiments.

FIG. 3 is a flow diagram depicting example operations which may be taken by a profiling system 100, shown in FIG. 5, for providing generic user profile based on user behaviour data comprising a data storage device 600 (including at least one generic user profile) and an electronic communication device 100. All steps performed are described in a logical order of the steps (which may not correspond to the order in which the steps are performed).

According to some aspects, the method of the profiling system comprises accessing (or providing access to) S110 a generic user profile for a user including behaviour data. The generic user profile 620 of the user is stored in a non-transitory computer readable medium 610 of the data storage device 600.

The method further comprises logging S120 (e.g., continuously) user behaviour data for the user 10. The logged behaviour data includes at least one of actions performed by the user in computer applications, a profile of the user on social media networks, or actions performed by the user on social media networks. Examples of user activity or behaviour is social activities/behaviour such as using Facebook, working, being at home, exercising at the gym, online activities/behaviour such as playing a game, reading books from a specific category, reading articles of a specific topic, listening to music, listening to a specific radio program, physical activities/behaviour such as how many times you are repeating an exercise at the gym machine. The behaviour may be, e.g., logged by applications running on the electronic device 100, the location of the electronic device 100, applications running on other devices (e.g., gaming system, desktop computers, tablet computers, etc.). As will be understood by one of ordinary skill in the art, the behaviour data may be logged by any suitable device or program associated with the user that are running on the electronic device 100 or a separate electronic device).

The method further comprises transmitting S130 the logged behaviour data to a processing device 110. The processing device 110 may be circuitry 108 of the electronic communication device 100 or the data storage device 600 or a device separate from the electronic communication device 100 and data storage device 600.

The method further comprises updating S140 with the processing device 110 the generic user profile 620 of the user 10 to include the transmitted user behaviour data 630. The generic user profile 620 of the user may be updated using circuitry of any suitable device (e.g., the electronic communication device 100 and storage device 600).

For particular behaviour data in the generic user profile of the user that is incongruous with the transmitted behaviour data, updating S140 the generic user profile 620 of the user 10 to include the transmitted user behaviour data 630 may include overwriting the particular behaviour data included in the generic user profile of the user with the transmitted user behaviour data. For example, if the generic user profile 620 indicates that the user 10 works out at Gym A, but the transmitted behaviour data 630 indicates that the user has worked out all month at Gym B, then the generic user profile 620 may be updated to replace the reference to Gym A with a reference to Gym B. Alternatively or additionally, the generic user profile 620 may be updated such that the reference to Gym B is maintained in the generic user profile 620 as a historic record, while the generic user profile 620 is updated to show that the current gym for the user 10 is Gym B. Data may be determined to be incongruous if the two pieces of data are mutually exclusive. For example, data is incongruous if one piece of data indicates user A is in Cleveland and the other piece of data indicates user A is in Chicago.

For the transmitted user behaviour data that is not incongruous with the behaviour data in the generic user profile of the user, updating S140 the generic user profile 620 of the user 10 to include the transmitted user behaviour data 630 may also include adding the transmitted user behaviour data to the behaviour data included in the generic user profile of the user. For example, if the transmitted behaviour data does not conflict (e.g., is not mutually exclusive) with behaviour data stored in the generic user profile for the user, the transmitted behaviour data may be added to the generic user profile.

The method further comprises continuously updating S150 at least one user profile 106 of at least one computer program 104 installed on an electronic communication device 100 of the user 10 based on the updated generic user profile 620. Updating the user profile of a particular computer program alters a setup of the particular computer program and may include changing settings of the computer program.

For example, if a user 10 is playing a game in a specific genre and getting higher skill levels due to practice, the generic user profile 620 may be updated based on this enhanced gaming skills, user behaviour or activity. User profiles 106 of other game applications may then be updated based on these enhanced gaming skills and when the user starts to play another game the user will start at a more accurate level.

The method may further include identifying with the processing device 110 at least one matching user profile of the plurality of generic user profiles 610. That is, the non-transitory computer readable medium 610 may store a plurality of generic user profiles 620. Each of the generic user profiles may correspond to a particular user and each of the generic user profiles may include behaviour data for the particular user. The at least one matching user profile may be identified based on the fact that it includes behaviour data matching the behaviour data included in the generic user profile of the user. The processing device 610 may update the generic user profile 620 of the user 10 to include behaviour data 630 included in the at least one matching user profile that does not correspond to any of the behaviour data included in the generic user profile of the user.

Particular behaviour data of the transmitted behaviour data may not correspond to behaviour data included in the generic user profile of the user if the generic user profile does not include comparable data. For example, if the generic user profile of the user does not include food preferences, but the transmitted behaviour data identifies a preference for Italian food. This food data does not correspond to data stored in the behaviour data of the generic user profile of the user and, for this reason, the food preference may be added to the behaviour data of the generic user profile of the user.

Behaviour data of a first user may match behaviour data of a second user when a percentage of the behaviour data of the first user that is equivalent to behaviour data of the second user is greater than a predefined threshold. For example, assume the first user data includes behaviour data for TV show preferences, food preferences, video game preferences, and book preferences, while the second user data includes behaviour data for TV show preferences, video game preferences, book preferences, and car preferences. In this example, the first and second user data include three equivalent forms of behaviour data (i.e., TV show preferences, video game preferences, and book preferences). If the TV show preferences and video game preferences match, but the book preferences do not match for the two users, then 67% of the equivalent preferences match. Assuming that the threshold for stating that a first user and a second user match is 60%, then the two users would match. The threshold for determining that two users match may be any suitable number (e.g., 50%, 75%, 90%, etc.).

In one embodiment, each of the generic user profiles 620 additionally includes class data 640 identifying at least one class that the particular user is associated with. Each class includes default user behaviour data for members of the class. For a specific user that is not associated with any particular class, the class data for the specific user may identify that the specific user is not the member of any class.

In this embodiment, the method may further include, for each of the at least one class that the generic user profile of the user is associated with, updating the generic user profile of the user to include the default user behaviour data for each of the at least one class.

Alternatively or additionally, the method may further include matching S210 (e.g., continuously) the logged user behaviour data with user behaviour data in other generic user profiles to find at least one user with a generic user profile comprising at least one similar user behaviour data (e.g., working at the same firm, playing the same game, working out at the same gym or shopping at the same store). In one aspect the matched generic user profiles may be classified S220 by updating the class related data of the matched generic user profiles based on the matched user behaviour data. Classifying may also be called grouping, since users with matched user behaviour are grouped based on their behaviour or activities. Examples of classes or groups may be "at work" class, "game" class, "at gym" class, "rock music" class.

In one aspect the class related data is based on matching user behaviour on a regular basis, such as working at the same firm. In one aspect the class related data is based on matching user behaviour during a shorter period, such as visiting Rome in Italy for one week.

The method may also include updating the generic user profile of the user (e.g., with the processing device) by setting a status of the class data identifying a particular class to disabled as indicated at step S225. For example, the class data may be set to disabled when the transmitted user behaviour data is incongruous with the default user data of the particular class. For example, assume the default user data for Class Alpha is that members live in Seattle and work at Company A. If the user 10 moves from Seattle to Denver and changes jobs from Company A to Company Z, then the behaviour data 630 for the user 10 is incongruous with the default user data of Class Alpha. As described above, data may be incongruous when it does not match and/or is mutually exclusive. For example, if the behaviour data describes a place of employment and two pieces of data indicate different places of employment then the data is incongruous. As another example, data is incongruous if one piece of data indicates that a user likes Italian food and another piece of data indicates that a user dislikes Italian food. However, data may not be incongruous, because it does not match. For example, data is not incongruous if one piece of data indicates that a user likes Italian food and the other piece of data indicates that a user likes Mexican food, because it is possible for a user to like both Italian and Mexican food.

When class data is set to disabled, the user profile may be updated to remove the default user behaviour of the particular class from the behaviour data included in the generic user of the user profile. For example, if the user was a member of Class Alpha (having default user behaviour of A, B, and C), then the default user behaviour of Class Alpha may have been added to the behaviour data for the generic user profile of the user. Once Class Alpha is mark as disabled in the generic user profile of the user, then the default user behaviour (i.e., behaviour A, B, and C) may be removed from the generic user profile of the user. As another example, when a user is no longer is in Rome, Italy the status of the "Rome" class related data is set to "disabled". The status of the "Rome" class related data may be set to "enabled" next time the user visit Rome. Another example is when the user go to work, the status of the "work" class related data will be set to enabled when the user logs on to the intranet of the firm and sets to disabled when the user logs out of the intranet and ends the working day.

The method may also include subscribing to updates to the default user behaviour of at least one particular class that the generic user profile of the user is associated with. When the default user behaviour of at least one particular class is updated, the behaviour data of the generic user profile of the user may be updated based on the modification of the default user behaviour of the at least one particular class. For example, if user A is a member of class alpha and class alpha has default user behaviour of A and B that is updated to be A and D, then the behaviour data for user A may be updated to remove behaviour B and to add behaviour D.

In one example, events S310 defined by when class related data are updated may be monitored. In one aspect these monitored events may be subscribed S320 to by, e.g., trusted parties (such as merchants, ad companies, etc.). The parties that subscribe to these events may be able to direct information or ads to groups of users that are most likely to take interest of the information or ads related to the class or group. For example, when a user enters the "Rome" class, the user is most likely to be interested in information of Rome and when the user leaves the "Rome" class the user is most likely no longer interested in Rome related information. In one aspect the subscription may be limited in time. The limits may be set by the subscribing parties or the owner of the user profile.

When searching for a generic user profile for a user, it may be that the generic user profile for the user does not yet exist. In this instance, the method may also include, when the generic user profile of the user does not exist, identifying (e.g., with the processing device) a specific user profile for a specific user of the plurality of generic user profiles. The specific user and the user (for which the generic user profile does not yet exist) may be connected via social media and/or when the specific user and the user interact electronically for greater than a predetermined threshold. For example, two users may be identified as connected if they communicate by text message, phone calls, email, direct messages on social networks, etc. with a given frequency (e.g., greater than five times per month). The generic user profile of the user may be created by copying the specific user profile of the plurality of generic user profiles into the generic user profile of the user.

The method may also include updating the generic user profile by overwriting the behaviour data of the generic user profile of the user that was copied from the specific user profile with the transmitted user behaviour data when the actions of the transmitted user behaviour data are incongruous with the copied user behaviour data.

For example, if a generic user profile does not exist for user A, then generic user profile for user A's Facebook friends (e.g., user B) can be used to bootstrap the profile of user A. In this example, the generic user profile for user A may be a copy of the generic user profile for user B. The generic user profile of user A may then be improved as behaviour data for user A is collected and used to update the generic user profile.

As another example, if the user 10 is new and does not have a generic user profile in the data storage device 600 a generic user profile may be created S115 by copying or bootstrapping another generic user profile within the data storage 600 with at least one user characteristic in common with the new user. Examples of user characteristics may be age, gender, location of living, location of work, education level. As described above, the new user and the other user may be Facebook friends, at the same age, same gender, living in the same geographical area or using the same or similar applications.

FIG. 5 illustrates an example of a system 1000 for providing generic user profiles based on user behaviour data, which may incorporate some of the example embodiments discussed above. The system comprises a data storage device 600 (including an non-transitory computer readable medium storing at least one generic user profile), an electronic communication device 100 (e.g., including an application (App)) and a processing device 100. The electronic communication device 100 and data storage device 600 may include circuitry, a non-transitory computer readable medium (memory), and/or a network interface. The processing device 110 may also include circuitry, a non-transitory computer readable medium (memory), and/or a network interface. However, as described above, the processing device 110 may be part of the electronic communication device 100 and/or the data storage device 600.

As will be understood by one of ordinary skill in the art, the electronic communication device 100 may comprise a smartphone, tablet, mobile device, or any other suitable electronic device. The data storage device 600 and processing device 110 may comprise any suitable electronic device (e.g., a server, desktop computer, laptop computer, etc.).

As will be understood by one of ordinary skill in the art, the circuitry of any or all of the above devices may have various implementations. For example, the circuitry may include any suitable device, such as a programmable circuit, integrated circuit, memory and I/O circuits, an application specific integrated circuit, microcontroller, complex programmable logic device, other programmable circuits, or the like. The circuitry may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry. The circuitry may be communicatively coupled to the computer readable medium and network interface through a system bus, mother board, or using any other suitable structure known in the art.

As will be understood by one of ordinary skill in the art, the computer readable medium referred to above may be, for example, one or more of a buffer, a flash memory, a hard drive, a removable media, a volatile memory, a non-volatile memory, a random access memory (RAM), or other suitable device. In a typical arrangement, the computer readable medium may include a non-volatile memory for long term data storage and a volatile memory that functions as system memory for the circuitry. The computer readable medium may exchange data with the circuitry over a data bus. Accompanying control lines and an address bus between the computer readable medium and the circuitry also may be present. The computer readable medium is considered a non-transitory computer readable medium.

As will be understood by one of ordinary skill in the art, the network interface may comprise a wireless network adaptor, an Ethernet network card, a cellular radio or any suitable device that provides an interface providing communication between the communication device 100, the processing device 110, and/or the storage device 200. The network interface may be communicatively coupled to the computer readable medium, such that the network interface is able to send data stored on the computer readable medium across the network and store received data on the computer readable medium. The network interface may also be communicatively coupled to the circuitry such that the processor is able to control operation of the network interface. The network interface, computer readable medium, and circuitry may be communicatively coupled through a system bus, mother board, or using any other suitable manner as will be understood by one of ordinary skill in the art.

In one embodiment, the memory 102 includes computer-executable instructions. The computer-executable instructions, when executed by circuitry, perform operations comprising the steps of:
- providing access S110 to or accessing a data storage device comprising at least one generic user profile;
- continuously logging S120 user behaviour data defining a behaviour of a user 10 of the method;
- transmitting S130 the logged behaviour data to a processing device 110 for processing the logged user behaviour data;
- updating S140 the generic user profile of the user based on the processed user behaviour data; and
- updating S150 user profiles of at least one computer related application installed on an electronic communication device of the user based on the updated generic user profile.

In one embodiment the user profile comprises class related data and wherein the instructions further perform operations comprising the steps of:
- continuously matching S210 the logged user behaviour data with user behaviour data in generic user profiles within the data storage for finding at least one user with a generic user profile comprising at least one similar user behaviour data; and
- classifying S220 the matched generic user profiles by updating the class related data of the matched generic user profiles based on the matched user behaviour data.

In one embodiment the instructions further performs operations comprising the steps of:
- monitoring events S310 defined by when class related data is updated; and
- subscribing S320 to the monitored events.

In one embodiment the instructions perform operation of creating S115 a generic user profile of the user by copying a user profile within the data storage with at least one user characteristics in common with the user if a generic user profile of the user is not in the data storage.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

All ranges and ratio limits disclosed in the specification and claims may be combined in any manner. Unless specifically stated otherwise, references to "a," "an," and/or "the" may include one or more than one, and that reference to an item in the singular may also include the item in the plural.

The phrase "and/or" means "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" has the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, means at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method performed by circuitry for generating a user profile based on user behaviour data, the method comprising:
   searching a non-transitory computer readable medium for a generic user profile for a user including default behaviour data, wherein:
      the non-transitory computer readable medium stores a plurality of generic user profiles;
      each of the generic user profiles corresponds to a particular user; and
      each of the generic user profiles includes default behaviour data for the particular user;
   when the generic user profile for the user is identified, the circuitry accesses the generic user profile;
   when the generic user profile of the user does not exist, the circuitry automatically creates the generic user profile by:
      identifying a specific user profile for a specific user of the plurality of generic user profiles, wherein:
         the specific user and the user are connected via social media and/or when the specific user and the user interact electronically with a frequency greater than a predetermined threshold; and
      copying the identified specific user profile of the plurality of generic user profiles into the generic user profile of the user:
   logging behaviour data for the user, the logged behaviour data including at least one of actions performed by the user in computer applications, a profile of the user on social media networks, or actions performed by the user on social media networks;
   transmitting the logged behaviour data to a processing device;
   updating with the processing device the generic user profile of the user to include the transmitted logged user behaviour data; and
   updating at least one user profile of at least one computer program installed on an electronic communication device of the user based on the updated generic user profile, wherein updating the user profile of a particular computer program alters a configuration of the particular computer program that affects how the computer program interacts with the user.

2. The method according to claim 1, wherein updating the generic user profile of the user to include the transmitted logged user behaviour data includes:
   for particular behaviour data in the generic user profile of the user that is incongruous with the transmitted logged user behaviour data, overwriting the particular behaviour data included in the generic user profile of the user with the transmitted logged user behaviour data;
   for the transmitted logged user behaviour data that is not incongruous with the behaviour data in the generic user profile of the user, adding the transmitted logged user behaviour data to the behaviour data included in the generic user profile of the user.

3. The method according to claim 1,
   further comprising:
   identifying with the processing device at least one matching user profile of the plurality of generic user profiles, the at least one matching user profile including behaviour data matching the transmitted logged user behaviour data included in the generic user profile of the user; and
   updating with the processing device the generic user profile of the user to include behaviour data included in the at least one matching user profile that does not correspond to any of the behaviour data included in the generic user profile of the user.

4. The method according to claim 3, wherein behaviour data of a first user matches behaviour data of a second user when a percentage of the behaviour data of the first user that is equivalent to behaviour data of the second user is greater than a predefined threshold.

5. The method according to claim 1, wherein:
   each of the generic user profiles additionally includes class data identifying at least one class that a particular user is associated with;
   each class includes default user behaviour data for members of the class; and
   the method further comprises, for each of the at least one class that the generic user profile of the user is associated with, updating the generic user profile of the user to include the default user behaviour data for each of the at least one class.

6. The method according to claim 5, wherein:
   the class data for a specific user identifies that the specific user is a member of a class that no other user is associated with; and
   the specific user differs from the particular user.

7. The method according to claim 5, the method further comprising:
   updating the generic user profile of the user with the processing device by setting a status of the class data identifying a particular class to disabled when the transmitted logged user behaviour data is incongruous with the default user data of the particular class;
   wherein the user profile is updated to remove default user behaviour of the particular class from the behaviour data of the user profile when the status of the class data identifying the particular class is set to disabled.

8. The method according to claim 1, wherein the subscription is limited to a prescribed time period.

9. The method according to claim 1, further comprising:
   subscribing the user to a particular class having a profile, such that:
      when the profile of the subscribed particular class is updated, the generic user profile of the user is updated to incorporate changes included in the update to the particular class.

10. The method according to claim 9, wherein creating the generic user profile comprises overwriting the behaviour data of the generic user profile of the user that was copied from the specific user profile with the transmitted logged user behaviour data when the actions of the transmitted logged user behaviour data are incongruous with user behaviour data copied from the specific user profile.

11. A system for generating a user profile based on user behaviour data, the system comprising:
   a processing device;
   a data storage device including a non-transitory computer readable medium storing a plurality of generic users, wherein:
      each of the generic user profiles corresponds to a particular user;
      each of the generic user profiles includes default behaviour data for the particular user;
   an electronic communication device associated with the user comprising circuitry configured to:
      search the non-transitory computer readable medium for a generic user profile for a user;

when the generic user profile for the user is identified, access the generic user profile;
when the generic user profile of the user does not exist, automatically create the generic user profile by:
identify a specific user profile for a specific user of the plurality of generic user profiles, wherein:
the specific user and the user are connected via social media and/or when the specific user and the user interact electronically with a frequency greater than a predetermined threshold; and
copying the identified specific user profile of the plurality of generic user profiles into the generic user profile of the user
log behaviour data for the user, the logged behaviour data including at least one of actions performed by the user in computer applications, a profile of the user on social media networks, or actions performed by the user on social media networks;
transmit the logged behaviour data to a processing device, wherein the processing device is configured to update the generic user profile of the user to include the transmitted logged user behaviour data; and
update at least one user profile of at least one computer program installed on the electronic communication device based on the updated generic user profile, wherein updating the user profiles of a particular computer program alters a configuration of the particular computer program that affects how the computer program interacts with the user.

12. The system according to claim 11, wherein updating the generic user profile of the user to include the transmitted logged user behaviour data includes:
for particular behaviour data in the generic user profile of the user that is incongruous with the transmitted logged user behaviour data, overwriting the particular behaviour data included in the generic user profile of the user with the transmitted logged user behaviour data;
for the transmitted logged user behaviour data that is not incongruous with the behaviour data in the generic user profile of the user, adding the transmitted logged user behaviour data to the behaviour data included in the generic user profile of the user.

13. The system according to claim 11, wherein the processing device is further configured to:
identify at least one matching user profile of the plurality of generic user profiles, the at least one matching user profile including behaviour data matching the transmitted logged user behaviour data included in the generic user profile of the user;
update the generic user profile of the user to include behaviour data included in the at least one matching user profile that does not correspond to any of the behaviour data included in the generic user profile of the user.

14. The system according to claim 13, wherein the processing device is further configured to:
when the generic user profile of the user does not exist, identify a specific user profile for a specific user of the plurality of generic user profiles, wherein the specific user and the user are connected via social media and/or when the specific user and the user interact electronically with a frequency greater than a predetermined threshold;
create the generic user profile of the user by copying the specific user profile of the plurality of generic user profiles into the generic user profile of the user.

15. The system according to claim 13, wherein:
each of the generic user profiles additionally includes class data identifying at least one class that the particular user is associated with;
each class includes default user behaviour data for members of the class; and
the processing device is further configured to, for each of the at least one class that the generic user profile of the user is associated with, update the generic user profile of the user to include the default user behaviour data for each of the at least one class.

16. A non-transitory computer-readable storage memory including computer-executable instructions that, when executed by circuitry, cause the circuitry to:
search a data storage device including a non-transitory computer readable medium for a generic user profile for a user including default user behaviour data, wherein:
the non-transitory computer readable medium stores a plurality of generic user profiles;
each of the generic user profiles corresponds to a particular user; and
each of the generic user profiles includes default behaviour data for the particular user;
when the generic user profile for the user is identified, access the generic user profile;
when the generic user profile of the user does not exist, automatically create the generic user profile by:
identifying a specific user profile for a specific user of the plurality of generic user profiles, wherein:
the specific user and the user are connected via social media and/or when the specific user and the user interact electronically with a frequency greater than a predetermined threshold; and
copy the identified specific user profile of the plurality of generic user profiles into the generic user profile of the user;
log user behaviour data for the user, the logged user behaviour data including at least one of actions performed by the user in computer applications, a profile of the user on social media networks, or actions performed by the user on social media networks;
transmit the logged user behaviour data to a processing device;
update with the processing device the generic user profile of the user to include the transmitted logged user behaviour data; and
update with the processing device at least one user profile of at least one computer program installed on an electronic communication device of the user based on the updated generic user profile, wherein updating the user profiles of a particular computer program alters a configuration of the particular computer program that affects how the computer program interacts with the user.

17. The non-transitory computer-readable storage medium according to claim 16, wherein updating the generic user profile of the user to include the transmitted logged user behaviour data includes:
for particular behaviour data in the generic user profile of the user that is incongruous with the transmitted logged user behaviour data, overwriting the particular behaviour data included in the generic user profile of the user with the transmitted logged user behaviour data;
for the transmitted logged user behaviour data that is not incongruous with the behaviour data in the generic user profile of the user, adding the transmitted logged user behaviour data to the behaviour data included in the generic user profile of the user.

18. The computer-readable storage medium according to claim 16,
the instructions that, when executed by circuitry, additionally cause the circuitry to:
identify with the processing device at least one matching user profile of the plurality of generic user profiles, the at least one matching user profile including behaviour data matching the transmitted logged user behaviour data included in the generic user profile of the user;
update with the processing device the generic user profile of the user to include behaviour data included in the at least one matching user profile that does not correspond to any of the behaviour data included in the generic user profile of the user.

19. The computer-readable storage medium according to claim 17, wherein said instructions that, when executed by circuitry, additionally:
when the generic user profile of the user does not exist, identify with the processing device a specific user profile for a specific user of the plurality of generic user profiles, wherein the specific user and the user are connected via social media and/or when the specific user and the user interact electronically with a frequency greater than a predetermined threshold;
create the generic user profile of the user by copying the specific user profile of the plurality of generic user profiles into the generic user profile of the user.

20. A method for generating a user profile based on user behaviour data, the method comprising:
when a generic user profile of the user does not exist, creating the generic user profile by:
identifying with the processing device a specific user profile for a specific user of the plurality of generic user profiles, wherein:
the specific user and the user are connected via social media and/or when the specific user and the user interact electronically with a frequency greater than a predetermined threshold; and
copying the specific user profile of the plurality of generic user profiles into the generic user profile of the user;

accessing the generic user profile for a user including default behaviour data, the generic user profile of the user stored in a non-transitory computer readable medium, wherein:
the non-transitory computer readable medium stores a plurality of generic user profiles;
each of the generic user profiles correspond to a particular user; and
each of the generic user profiles includes default behaviour data for the particular user;
logging behaviour data for the user, the logged behaviour data including at least one of actions performed by the user in computer applications, a profile of the user on social media networks, or actions performed by the user on social media networks;
transmitting the logged behaviour data to a processing device;
updating with the processing device the generic user profile of the user to include the transmitted logged user behaviour data, wherein the behaviour data of the generic user profile of the user that was copied from the specific user profile is overwritten with the transmitted logged user behaviour data when the actions of the transmitted logged user behaviour data are incongruous with user behaviour data copied from the specific user profile;
identifying with the processing device at least one matching user profile of the plurality of generic user profiles, the at least one matching user profile including behaviour data matching the transmitted logged user behaviour data included in the generic user profile of the user;
updating with the processing device the generic user profile of the user to include behaviour data included in the at least one matching user profile that does not correspond to any of the behaviour data included in the generic user profile of the user; and
updating at least one user profile of at least one computer game installed on an electronic communication device of the user based on the updated generic user profile, wherein updating the user profile of a particular computer game alters a configuration of the particular computer game that affects how the particular computer game interacts with the user.

* * * * *